United States Patent [19]
Fuji

[11] Patent Number: 5,781,513
[45] Date of Patent: Jul. 14, 1998

[54] MAGNETIC-FIELD MODULATION RECORDING METHOD AND DEVICE FOR PREVENTING RESIDUAL INFORMATION FROM REMAINING AFTER OVERWRITING

[75] Inventor: Hiroshi Fuji, Kyoto, Japan

[73] Assignee: Sharp Kabushiki Kaisha, Osaka, Japan

[21] Appl. No.: 595,842

[22] Filed: Feb. 2, 1996

[30] Foreign Application Priority Data

Feb. 27, 1995 [JP] Japan ................................... 7-038700
Dec. 25, 1995 [JP] Japan ................................... 7-337298

[51] Int. Cl.$^6$ ...................................................... G11B 11/00
[52] U.S. Cl. ........................................... 369/13; 369/100
[58] Field of Search ............................ 369/13, 283, 14, 369/275.2, 275.3, 275.1, 99, 107, 116, 100, 44.38, 44.39, 44.26; 360/59, 114; 428/332

[56] References Cited

U.S. PATENT DOCUMENTS

| | | | |
|---|---|---|---|
| 4,982,396 | 1/1991 | Yasuoka et al. | 369/100 |
| 5,295,121 | 3/1994 | Sukeda et al. | 369/275.2 |
| 5,329,408 | 7/1994 | Fuji | 360/59 |
| 5,420,836 | 5/1995 | Machida | 369/13 |
| 5,428,594 | 6/1995 | Izumi et al. | 369/99 |
| 5,461,595 | 10/1995 | Machida | 369/13 |
| 5,469,422 | 11/1995 | Sohmuta | 369/100 |
| 5,475,657 | 12/1995 | Sato et al. | 369/13 |

OTHER PUBLICATIONS

"High Density Overwriting in Exchange–Coupled Magneto–Optical Multilayer Films" (Y. Nakaki et al. IEEE Transactions On Magnetics, vol. 28 No. 5, Sep. 1992, pp.2509–2511.

*Primary Examiner*—Ali Neyzari
*Attorney, Agent, or Firm*—Nixon & Vanderhye

[57] ABSTRACT

A magneto-optical recording medium has a recording layer on which information is recorded and an auxiliary layer magnetic-coupled with the recording layer. A recording magnetic field whose direction is reversed between upward and downward directions according to the recording information is applied while irradiating a laser beam on the magneto-optical recording medium so that the center of the irradiated region becomes a high-temperature portion and the periphery of the high-temperature portion becomes a medium-temperature portion whose temperature is lower than the temperature of the high-temperature portion. On the recording layer, a direction of magnetization in the high-temperature portion of the irradiated region is recorded according to the direction of the recording magnetic field, while a direction of magnetization in the medium-temperature portion is recorded in the initialized direction irrespectively of the direction of the recording magnetic field. This structure prevents residual information from remaining on both sides of a recording mark after overwriting, and achieves an improved S/N ratio during reproduction.

13 Claims, 13 Drawing Sheets

MAGNETIC-FIELD MODULATION RECORDING METHOD AND DEVICE FOR PREVENTING RESIDUAL INFORMATION FROM REMAINING AFTER OVERWRITING

FIELD OF THE INVENTION

The present invention relates to a method and device for magnetic-field modulation recording, for recording information on magneto-optical recording media, such as a magneto-optical disk, a magneto-optical tape and a magneto-optical card, while modulating a magnetic field.

BACKGROUND OF THE INVENTION

As a method for overwriting information on a magneto-optical recording medium, two methods have been known.

The first method is a so-called magnetic-field modulation overwriting in which information is overwritten by reversing a magnetic field according to recording information while irradiating a magneto-optical recording medium with a uniform strong light beam. Japanese Publication for Unexamined Patent Application (Tokukaihei) No. 5-67357 (corresponding to U.S. Pat. No. 5,329,408) discloses an example of this method. FIG. 14 is provided to explain recording of information by magnetic-field modulation overwriting. In this method, when recording information aa is input to a magnetic head driving circuit 103 while irradiating a recording film 101 with a strong laser beam 102, a recording magnetic field is generated by a magnetic head coil 104 according to the recording information aa. As a result, reversal of magnetization occurs only in an area bb where the temperature of the recording film 101 is raised, and the recording information aa is recorded as the direction of magnetization of the recording film 101.

FIG. 12 is a view showing temperature distribution cc in the cross section of the recording film 101, cut along a direction perpendicular to a track. In a region irradiated by the laser beam 102, the temperature is increased most at the center portion, and only the direction of magnetization in an area where the temperature exceeds the broken line in FIG. 12 and reaches a recording temperature becomes equal to the direction of a recording magnetic fields thereby recording information. In this case, only the head of a recording mark 105 becomes a circular shape with the reversal of the recording magnetic field, and therefore the shape of the recording mark 105 is like the shape of feathers fastened to an end of an arrow. For example, the recording mark 105 is an upwardly magnetized portion recorded on the recording film 101 of FIG. 14, and regions other than the recording mark 105 are downwardly magnetized portions recorded on the recording film 101. In short, the first method performs overwriting by reversing the direction of the recording magnetic field according to the recording information.

The second method is a so-called light-intensity modulation overwriting in which information is overwritten by modulating the intensity of a light beam according to an information signal while applying a uniform magnetic field. Japanese Publication for Unexamined Patent Application (Tokukaihei) No. 6-251443 discloses an example of this method. FIG. 13 is provided to explain recording of information by light-intensity modulation overwriting. This method uses a multi-layer structure magneto-optical recording medium having at least two layers, i.e., an auxiliary layer 111 and a recording layer 112. The auxiliary layer 111 is magnetized in a uniform direction in advance by an initialization-use magnet 113. At this time, as shown in FIG. 15, since coercive force $H_2$ of the auxiliary layer 111 is smaller than initializing magnetic field $H_{init}$ at room temperature, the auxiliary layer 111 is initialized. However, coercive force $H_1$ of the recording layer 112 is greater than the initializing magnetic field $H_{init}$ at room temperature, the magnetization of the recording layer 112 is not reversed. Namely, only the auxiliary layer 111 is initialized.

Thereafter, a laser beam 123 is irradiated by switching the power thereof between high and low according to the recording information while applying recording magnetic field $H_W$ by means of a recording magnet 114. The power of the laser beam 123 is set high and low as follows. When the laser beam 123 of high power is irradiated, the magnetic force of the recording magnetic field $H_W$ becomes greater than the coercive force $H_2$ of the auxiliary layer 111, and both of the temperatures of the recording layer 112 and the auxiliary layer 111 are raised to recording temperature $T_H$ at which recording is available. The recording temperature $T_H$ is a temperature range higher than temperature $T_X$ of the intersection of the coercive force $H_2$ of the auxiliary layer 111 and the recording magnetic field $H_W$. The temperature $T_X$ is between Curie point $T_1$ of the rerecording layer 112 and Curie point $T_2$ of the auxiliary layer 111.

On the other hand, when the laser beam 123 of low power is irradiated, the temperatures of the recording layer 112 and the auxiliary layer 111 are raised to medium temperature $T_L$. The medium temperature $T_L$ is higher than temperature $T_Y$ of the intersection of the coercive force $H_1$ of the recording layer 112 and the recording magnetic field $H_W$ and lower than the temperature $T_X$. Namely, the medium temperature $T_L$ shows a temperature range within which the magnetic force of the recording magnetic field $H_W$ is greater than the coercive force $H_1$ of the recording layer 112 but smaller than the coercive force $H_2$ of the auxiliary layer 111.

Therefore, as illustrated in FIG. 13, when the laser beam 123 of high power is irradiated, the magnetization of the auxiliary layer 111 is reversed to an upward direction by the upwardly oriented recording magnetic field $H_W$, while the recording layer 112 is magnetized in the same direction as direction of magnetization of the auxiliary layer 111 by exchange forces functioning on the boundary surface during a cooling step. As a result, the recording layer 112 has a magnetization in an upward direction.

On the other hand, when the laser beam 123 of low power is irradiated, the temperature of the auxiliary layer 111 does not increase to the recording temperature $T_H$ at which the coercive force $H_2$ becomes smaller than the magnetic force of the recording magnetic field $H_W$. Consequently, the magnetization is not reversed by the recording magnetic field $H_W$. Similarly to the above, the recording layer 112 has a magnetization in the same direction as that of the auxiliary layer 111 due to exchange forces functioning on the boundary surface during the cooling step. As a result, the direction of magnetization of the recording layer 112 becomes downward.

FIG. 11 is a view showing temperature distribution dd in the cross section of the recording layer 112 and the auxiliary layer 111, cut along a direction perpendicular to a track, in the light-intensity modulation overwriting. As described above, in the region where the laser beam 123 of high power is irradiated, the temperature of the center portion of the recording layer 112 and the auxiliary layer 111 falls within the range of the recording temperature $T_H$, and the direction of magnetization of the auxiliary layer 111 and the recording layer 112 is recorded, for example, upward as shown in FIG. 13 according to the upwardly oriented recording magnetic field $H_W$ generated by the recording magnet 114. The upwardly magnetized portion becomes a recording mark 115 shown in FIG. 11(a). Since the recording mark 115 is recorded only in the region irradiated by the laser beam 123 of high power, it takes the shape of an ellipse. A portion 222 shown by the broken line in the vicinity of the recording mark 115 becomes the medium temperature $T_L$, and has a magnetization in the same direction as the direction of magnetization of the initialized auxiliary layer 111 (for example, in a downward direction in FIG. 13).

Next, in the region on which the laser beam 123 of low power is irradiated, the temperature of the center portion falls within the range of the erasing temperature (medium temperature) $T_L$, and the direction of magnetization of the recording layer 112 is recorded, for example, downward by the direction of magnetization of the auxiliary layer 111. The downwardly magnetized portion becomes an erased portion 116 shown in FIG. 11(b).

Thus, in the second method, the initializing magnetic field $H_{init}$ and the recording magnetic field $H_W$ are always fixed in a uniform direction, and overwriting is performed by changing the power of the light beam.

Moreover, light-intensity modulation overwriting is performed in the same manner on a magneto-optical recording medium having an intermediate layer between the recording layer 112 and the auxiliary layer 111, and therefore explanation thereof is omitted. IEEE Transactions on Magnetics, Vol. 28, No. 5, September 1992, discloses the configuration which permits light-intensity modulation overwriting on a magneto-optical recording medium having a switching layer and an initialized layer as well as the recording layer (memory layer) 112 and the auxiliary layer (writing layer) 111. In this magneto-optical recording medium, the switching layer and the initialized layer perform the same function as the above-mentioned initialization-use magnet 113. Except for this, the structure is the same as above, and therefore explanation is omitted.

However, the above-mentioned two conventional methods suffer from the following drawbacks. FIG. 9 is provided for explaining the problems of the conventional first method "overwriting by magnetic field modulation". In this method, by irradiating a laser beam 102, a new recording mark 119 is overwritten on an old recording mark 117 which has been recorded on a track. For example, when an ambient temperature of the magneto-optical recording medium at the time of overwriting the new recording mark 119 is lower than an ambient temperature of the magneto-optical recording medium at the time the old recording mark 117 was recorded, a reduced area reaches the recording temperature. Therefore, the width of the new recording mark 119 becomes smaller than that of the old recording mark 117. As a result, the old recording mark 117 cannot be erased completely, and residual information 118 remains. The residual information 118 deteriorates the S/N ratio when reproducing the recording mark 119 later, and causes a serious problem such as a reproduction error. Even when the ambient temperature is uniform during recording, if the power of the laser beam 102 is decreased, similar problems arise.

FIG. 10 is given for explaining the problems of the second conventional method "overwriting by light-intensity modulation". In this method, by irradiating a laser beam 123, a new recording mark 121 is overwritten on an old recording mark 120 which has been recorded on a track. For example, when an ambient temperature of the magneto-optical recording medium at the time of overwriting the new recording mark 121 is lower than an ambient temperature of the magneto-optical recording medium at the time the old recording mark 120 was recorded, a reduced area reaches the recording temperature $T_H$. Thus, the width of the new recording mark 121 becomes smaller than that of the old recording mark 120. As a result, the old recording mark 120 cannot be erased completely, and residual information 122 remains. The periphery of the new recording mark 121 is in the range of the erasing temperature (medium temperature) $T_L$, and thus the old recording mark 120 is erased. Consequently, the residual information 122 remains only on each side of the erased portion 124. Similarly to the first method, the residual information 122 deteriorates the S/N ratio when reproducing the recording mark 121 later, and causes a serious problem, i.e., a reproduction error. Even when the ambient temperature is uniform during recording, if the power of the laser beam 123 is decreased, similar problems arise.

SUMMARY OF THE INVENTION

It is an object of the present invention to provide a magnetic-field modulation recording method and a magnetic-field modulation recording device which are capable of preventing residual information after overwriting and achieving an improved S/N ratio during reproduction.

In order to achieve the above object, a magnetic-field modulation recording method of the present invention includes the steps of:

applying to a magneto-optical recording medium a recording magnetic field whose direction is reversed according to recording information while irradiating a light beam on the magneto-optical recording medium so that the center of a light-beam-irradiated region of the magneto-optical recording medium becomes a high-temperature portion and a periphery of the high-temperature portion becomes a medium-temperature portion whose temperature is lower than the temperature of the high-temperature portion; and recording a direction of magnetization so that the direction of magnetization in the high-temperature portion of the light-beam-irradiated region is recorded according to the direction of the recording magnetic field and the direction of magnetization in the medium-temperature portion is recorded only in one direction irrespectively of the direction of the recording magnetic field.

With this structure, since the light beam always produces the high-temperature portion in the center portion of a track, in the high-temperature portion, reversal of magnetization on a recording layer of a magneto-optical recording medium is carried out according to the direction of the recording magnetic field, thereby permitting recording of information. Moreover, since reversal of magnetization does not occur in the medium-temperature portion located on both sides of the high-temperature portion, i.e., erasure is always carried out, it is possible to prevent residual information from remaining after overwriting.

At this time, if a light beam whose power becomes zero at least at the moment the recording magnetic field is reversed is irradiated during recording of information, the temperature of an edge portion of a recording mark can be lowered. Consequently, the outline of the edge portion can be clearly recorded, and an improved S/N ratio can be achieved during reproduction.

In order to carry out the above magnetic-field modulation recording method, a magnetic-field modulation recording device of the present invention includes:

(1) a magneto-optical recording medium having a recording layer on which information is recorded and an auxiliary layer magnetic-coupled with the recording layer;

(2) an initializing device for initializing the direction of magnetization of the auxiliary layer in one direction by applying an initializing magnetic field before recording information;

(3) a light beam irradiating device, disposed distant from the initializing device, for generating a light beam so that the center of a light-beam-irradiated region of the magneto-optical recording medium becomes a high-temperature portion and a periphery portion of the high-temperature portion becomes a medium-temperature portion whose temperature is lower than the temperature of the high-temperature portion;

(4) a magnetic-head driver for generating a positive or negative recording current according to recording information; and a magnetic head coil for generating a recording magnetic field in the light-beam-irradiated region based on the recording current, (5) wherein, in the light-beam-irradiated region of the magneto-optical recording medium, the direction of magnetization in the high-temperature portion of the recording layer is recorded according to the direction of the recording magnetic field and the direction of magnetization in the medium-temperature portion is recorded in the same direction as the initialized direction of the auxiliary layer.

With this structure, first, the auxiliary layer is initialized by the initializing device before recording information. Subsequently, a recording magnetic field generated by the magnetic head coil is applied while irradiating a light beam on the magneto-optical recording medium by the light beam irradiating device. At this time, since the center portion of the light-beam-irradiated region becomes the high-temperature portion, reversal of magnetization occurs on the auxiliary layer according to the recording magnetic field. The direction of magnetization of the auxiliary layer is transferred to the recording layer during a cooling step, and a recording mark is recorded. Meanwhile, in the medium-temperature portion on the periphery of the high-temperature portion, since the direction of magnetization has not changed from the initialized direction, the recording layer has a magnetization in the same direction as the initialized direction.

Namely, recording is performed while initializing (erasing) both sides of the recording mark. Therefore, information does not form residue after overwriting. Consequently, a satisfactory S/N ratio is achieved during reproduction, and the reliability of reproduced data is improved. Additionally, since the reversal of the recording magnetic field is performed at a high speed by the magnetic head coil, it is possible to record the recording mark at a high speed.

Furthermore, it is also possible to use a magneto-optical recording medium having a recording layer on which information is recorded, an auxiliary layer magnetic-coupled with the recording layer, and an initialized layer having a magnetization whose direction is always uniform, instead of structures (1) and (2) above.

In this case, since the initializing device is formed only by the initialized layer, the effect of reducing the size of the magnetic-field modulation recording device is produced as well as the above-mentioned effect. In addition, since the initializing magnetic field is not limited, it is possible to relatively freely set the coercive force of the auxiliary layer.

For a fuller understanding of the nature and advantages of the invention, reference should be made to the ensuing detailed description taken in conjunction with the accompanying drawings.

DESCRIPTION OF THE PREFERRED EMBODIMENTS

[Embodiment 1]

The following description will discuss one embodiment of the present invention with reference to FIGS. 1 to 6 and 15.

Figure 1:
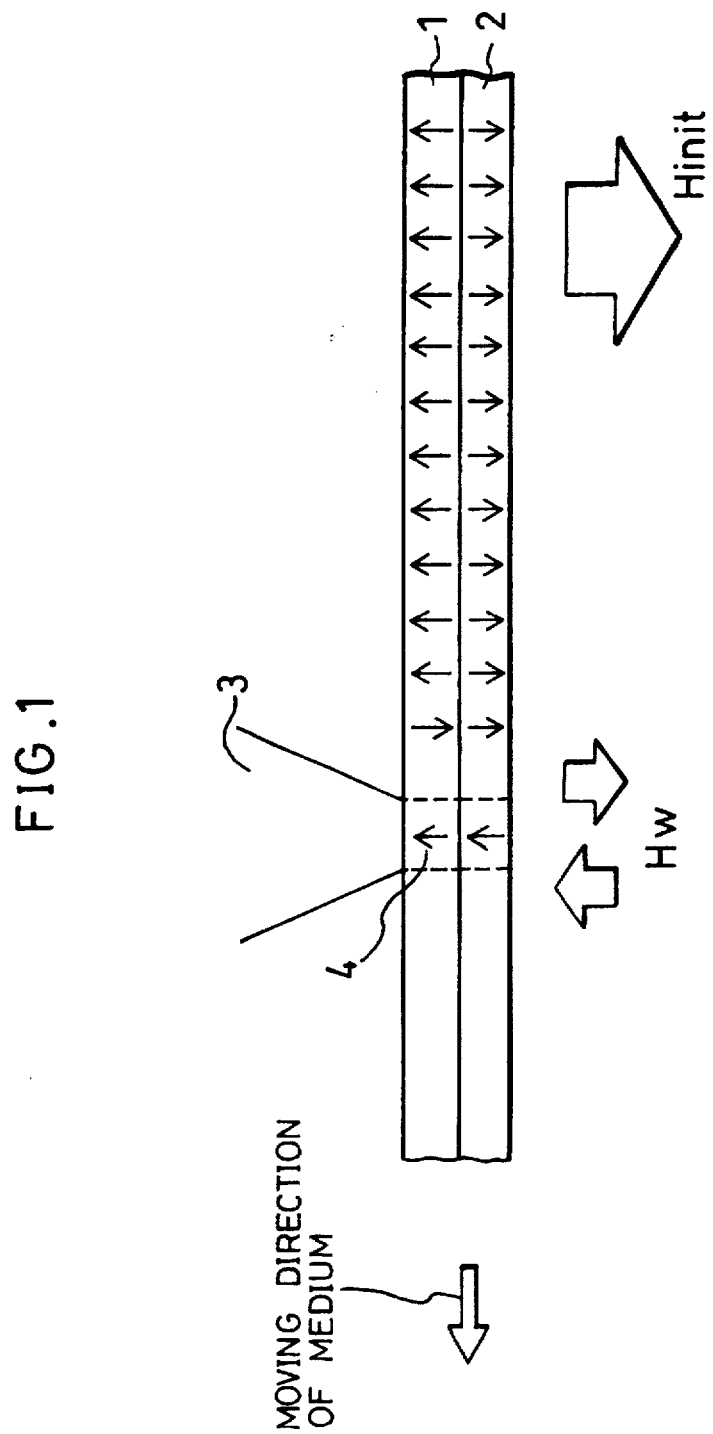
FIG. 1 is an explanatory view showing a magnetic-field modulation recording method according to a first embodiment of the present invention.

As illustrated in FIG. 1, a magneto-optical recording medium (hereinafter just referred to as the recording medium) used in this embodiment is a multilayer-structure recording medium having at least two layers, i.e., a recording layer 1 and an auxiliary layer 2. For instance, the recording medium satisfies the relation shown in FIG. 15, i.e., $H_2 < H_{init} < H_1$ (room temperature)

$H_1 < H_w < H_2$ (erasing temperature $T_L$)

$H_2 < H_w$ (recording temperature $T_H$)

where $H_1$ is the coercive force of the recording layer 1, $H_2$ is the coercive force of the auxiliary layer 2, $H_{init}$ is the initializing magnetic field, and $H_w$ is the recording magnetic field.

When recording information on such a recording medium, the auxiliary layer 2 is initialized in a uniform direction in advance by the initializing magnetic field $H_{init}$. In this embodiment, the direction of initialization is a downward direction. Subsequently, a laser beam 3 of uniform power is irradiated from one side of the recording medium, and the recording magnetic field $H_w$ whose direction is reversed according to recording information is applied from the other side of the recording medium to an area corresponding to a position 4 irradiated by the laser beam 3. As a result, the temperature of the irradiated position 4 of the laser beam 3 becomes high, and reversal of magnetization occurs on the auxiliary layer 2 according to the recording magnetic field $H_w$. In a cooling process, the direction of magnetization of the auxiliary layer 2 is transferred onto the recording layer 1 by the exchange forces functioning on both of the auxiliary layer 2 and the recording layer 1, and information is recorded on the recording layer 1.

Figure 2:
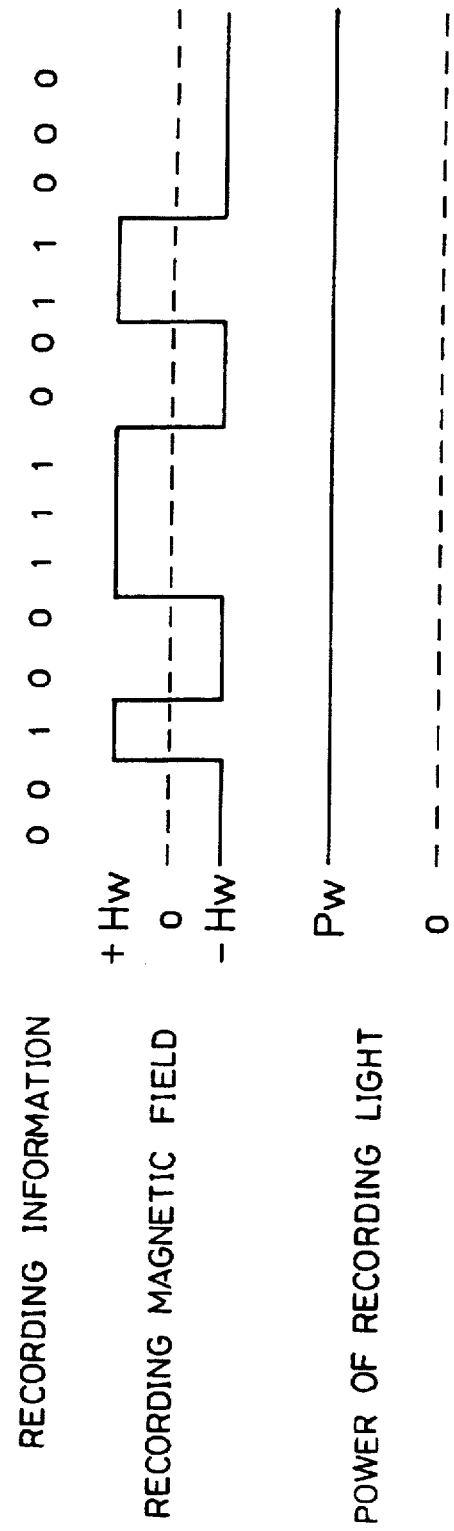
FIG. 2 is an explanatory view showing the relation between a recording magnetic field and the power of light for recording.

FIG. 2 shows the relation between the recording magnetic field $H_w$ and the power of the laser beam 3 for recording. For example, when the recording information is "1", the recording magnetic field $H_w$ is switched to an upward direction $(+H_w)$. On the other hand, when the recording information is "0", the recording magnetic field $H_w$ is switched to a downward direction $(-H_w)$. Uniform light $P_w$ whose power is constant irrespectively of the recording information is used for recording.

Figure 3:
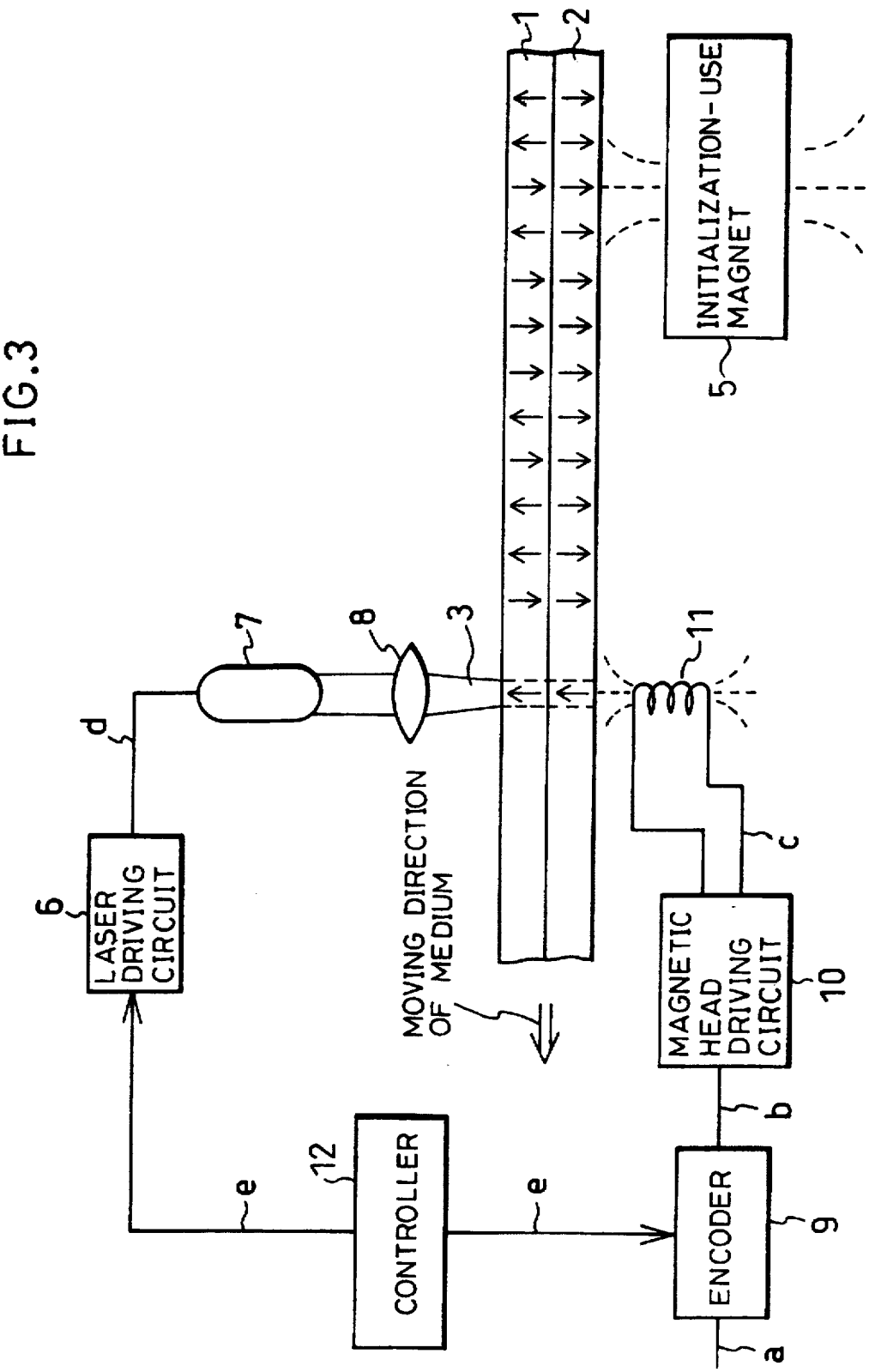
FIG. 3 is a view showing the structure of a magnetic-field modulation recording device used for carrying out the magnetic-field modulation recording method.

FIG. 3 illustrates an example of a magnetic-field modulation recording device which is used for carrying out the above-mentioned magnetic-field modulation recording method. The magnetic-field modulation recording device includes an initialization-use magnet 5, a laser driving circuit 6, a semiconductor laser 7, an objective lens 8, an encoder 9; a magnetic head driving circuit 10, a magnetic head coil 11, and a controller 12.

The initialization-use magnet 5 is a permanent magnet or an electromagnet, and initializes the auxiliary layer 2 always or only when recording. The permanent magnet is preferable to the electromagnet because the permanent magnet can easily produce a strong magnetic field and certainly initialize the auxiliary layer 2.

The semiconductor laser 7 is driven by the laser driving circuit 6, and emits the laser beam 3 for irradiating the recording medium. The objective lens 8 converges the laser beam 3 onto the recording medium. The laser driving circuit 6, the semiconductor layer 7 and the objective lens 8 form light beam irradiating means as set forth in claims 1 and 6.

The encoder 9 modulates data a, to be recorded, into recording information b. The modulation can be performed by known modulation methods, such as (1,7) RLL (run length limited), (2,7) RLL, and EFM (eight to fourteen modulation). The magnetic head driving circuit 10 generates a magnetic head driving current c whose direction is switched according to the recording information b, and supplies it to the magnetic head coil 11. In the magnetic head coil 11, the recording magnetic field $H_w$ is generated based on the magnetic head driving current c. Namely, the recording magnetic field $H_w$ is reversed depending on the direction of the magnetic head driving current c. The controller 12 outputs a recording instruction signal e to the encoder 9 and the laser driving circuit 6.

With this configuration, the auxiliary layer 2 is initialized in a downward direction in advance by the initialization-use magnet 5. When the recording instruction signal e is output by the controller 12, a driving current d is supplied to the semiconductor laser 7 by the laser driving circuit 6, and the laser beam 3 is irradiated on the recording layer 1 and the auxiliary layer 2.

Meanwhile, when the recording instruction signal e is input to the encoder 9, the data a is taken as the recording information b by the encoder 9 and input to the magnetic head driving circuit 10, and then the magnetic head driving current c is supplied to the magnetic head coil 11.

More specifically, when performing recording, the recording magnetic field $H_w$ is applied by the magnetic head coil 11 according to the recording information b while irradiating the recording medium with the laser beam 3. At this time, the recording medium is relatively moved with respect to the laser beam 3 and the recording magnetic field $H_w$.

Figure 6:
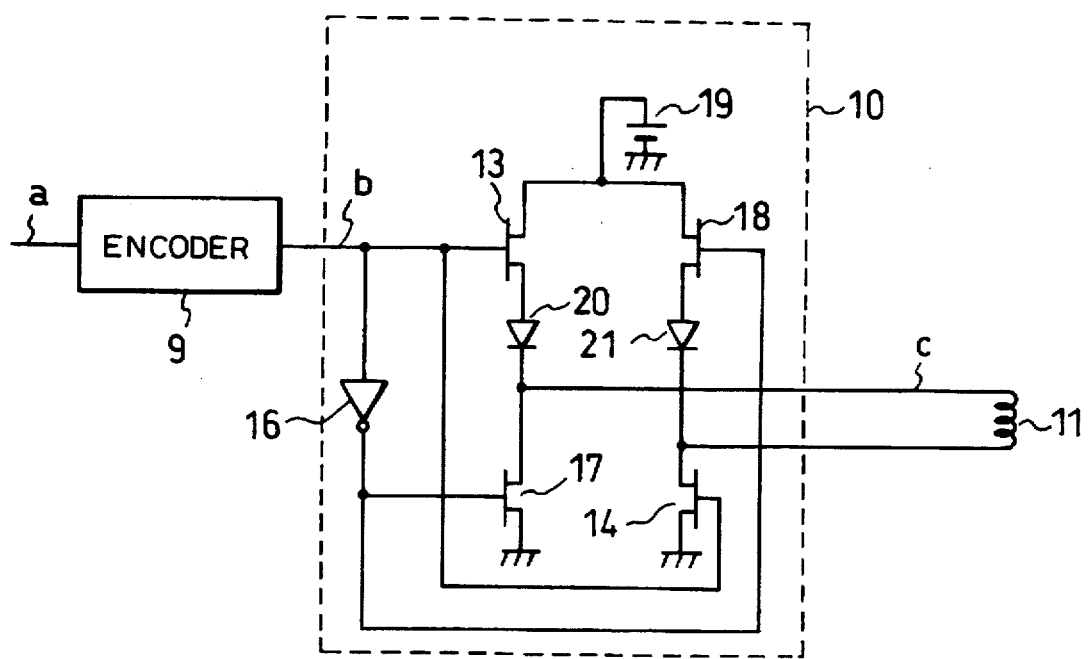
FIG. 6 is a circuit diagram showing the structure of a magnetic head driving circuit in the magnetic-field modulation recording device.

FIG. 6 is provided for explaining in detail the magnetic head driving circuit 10. For instance, the magnetic head driving circuit 10 is formed by four switching elements 13, 14, 17 and 18 made of power MOS FET (field effect transistor), two diodes 20 and 21, an inverter 16 and a power source 19.

The recording information b which was generated by converting the data a in the encoder 9 is output to the switching elements 13 and 14, and to the inverter 16. Similarly, the recording information b reversed by the inverter 16 is sent to the switching elements 17 and 18. For example, when the recording information b is "1", the switching elements 13 and 14 are turned on, while the switching elements 17 and 18 are turned off. At this time, the magnetic head driving current c from the power source 19 sequentially flows through the switching element 13, the diode 20, the magnetic head coil 11, and the switching element 14. On the other hand, when the recording information b is "0", the switching elements 13 and 14 are turned off, while the switching elements 17 and 18 are turned on. At this time, the magnetic head driving current c from the power source 19 sequentially flows through the switching element 18, the diode 21, the magnetic head coil 11, and the switching element 17.

Namely, when the recording information b is "1", the current flows in a downward direction in the magnetic head coil 11. When the recording information b is "0", the current flows in an upward direction in the magnetic head coil 11. It is thus possible to reverse the recording magnetic field $H_w$ as illustrated in FIG. 2.

Figure 4:
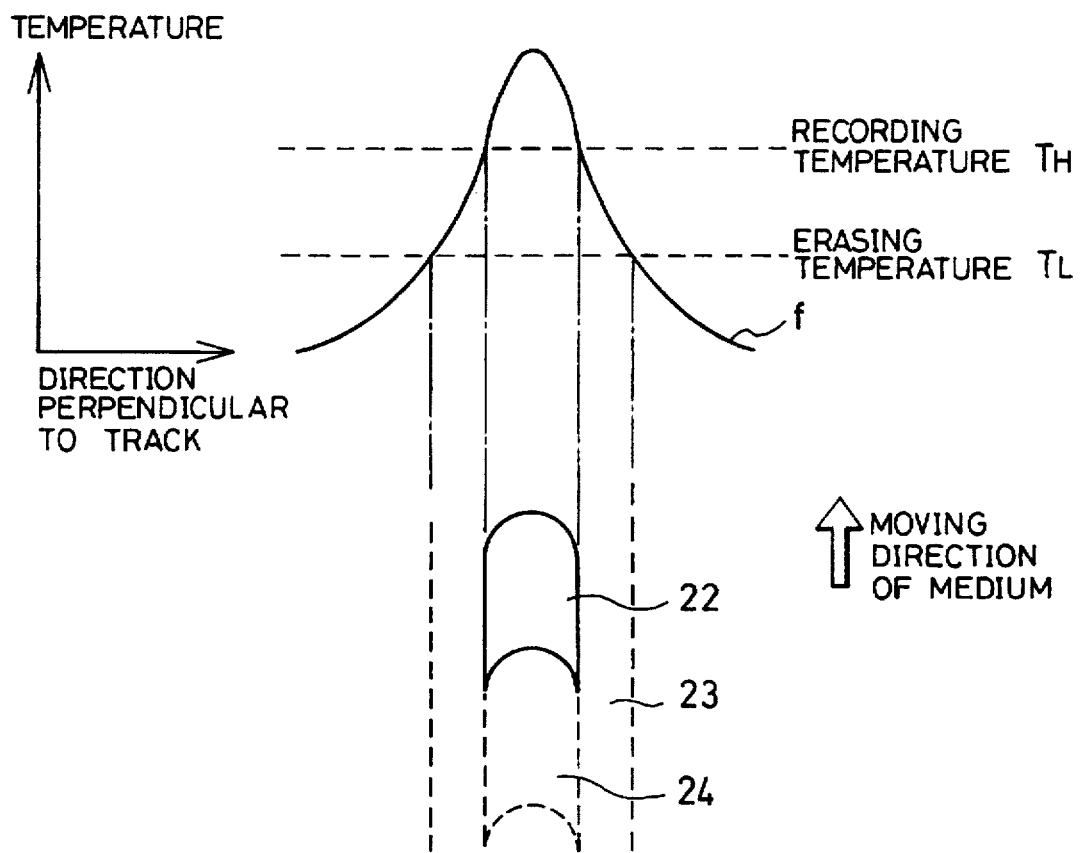
FIG. 4 is an explanatory view showing the temperature distribution on a track and the corresponding recorded state.

Shown at the top in FIG. 4 is a temperature distribution f in the cross section of the recording layer 1 and the auxiliary layer 2, cut along a direction perpendicular to a track, at the time the recording medium is irradiated by the laser beam 3. This temperature distribution f is Gaussian. Therefore, when the laser beam 3 is irradiated, the temperature at the center portion of the recording layer 1 and the auxiliary layer 2 becomes the recording temperature $T_H$.

For example, when the recording information b is "1", the direction of magnetization of the auxiliary layer 2 is equal to that of the recording magnetic field $H_W$, i.e., downward, and the direction of magnetization of the recording layer 1 is made equal to that of the auxiliary layer 2 by the magnetic forces functioning on the boundary surface in the cooling step. Namely, the direction of magnetization of the recording layer 1 is recorded downward according to the direction of the recording magnetic field $H_W$ generated by the magnetic head coil 11. The downwardly magnetized portion becomes an erased portion 24 enclosed by the broken line shown at the bottom in FIG. 4.

The temperature of a periphery portion 23 indicated by the broken line in the vicinity of the erased portion 24 becomes the medium temperature (erasing temperature) $T_L$ which is lower than the recording temperature $T_H$. Therefore, the direction of magnetization of the auxiliary layer 2 can never be reversed by the recording magnetic field $H_W$. The direction of magnetization of the recording layer 1 is made equal to that of the auxiliary layer 2 by the magnetic forces functioning on the boundary surface in the cooling step similarly to the above. Therefore, the direction of magnetization of the recording layer 1 is erased by the direction of magnetization (the downward direction in this embodiment) of the auxiliary layer 2 initialized. Consequently, the direction of magnetization of the erased portion 24 and that of the periphery portion 23 coincide with each other.

Thereafter, when the recording information b becomes "0" by the relative movement of the laser beam 3, the recording magnetic field $H_W$ is reversed to an upward direction. As a result, the direction of magnetization of the recording layer 1 is recorded upward, and a recording mark 22 is produced. The recording mark 22 is formed in a shape like the shape of feathers fastened to an end of an arrow. Similarly, the temperature of the periphery portion 23 of the recording mark 22 becomes the erasing temperature $T_L$, and is erased downward.

Figure 5:
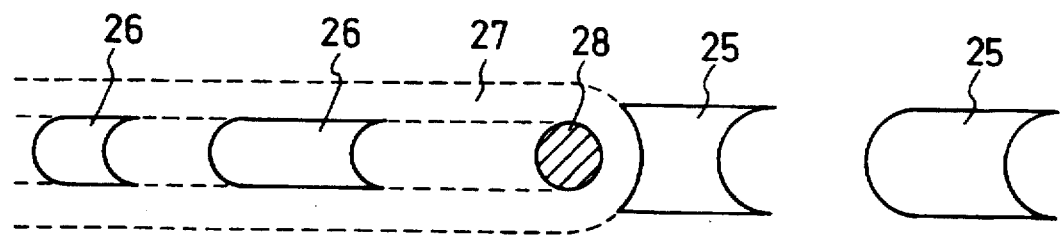
FIG. 5 is an explanatory view showing the recorded state of a recording mark when overwriting was performed by the magnetic-field modulation recording method.

FIG. 5 is provided for explaining the effect of overwriting of this embodiment. A new recording mark 26 is overwritten by a laser beam 28 on an old recording mark 25 recorded on a track. For instance, if the ambient temperature of the recording medium when overwriting the recording mark 26 is lower than the ambient temperature of the recording medium at the time the recording mark 25 was recorded, the area that reaches the recording temperature $T_H$ becomes narrower. As a result, the width of the recording mark 26 becomes narrower than that of the recording mark 25. However, since erasure is always performed in periphery portions 27 on both sides of the recording mark 26, the recording mark 25 can never leave any residue. It is thus possible to improve the S/N ratio when reproducing the recording mark 26, and improve the reliability of reproduced data.

Moreover, since the periphery portion 27 as the erased portion is certainly located between the recording mark 26 and a recording mark on an adjacent track, cross talk can be reduced to a great extent. It is therefore possible to increase the track density of the recording medium.

Furthermore, since the power of the laser beam 28 for recording is uniform, it is possible to unify the width of the recording mark 26 and stably erase areas with a uniform width on both sides of the recording mark 26.

Even when the temperature is fixed and the power of the laser beam 28 is lowered, the above-mentioned effects can also be obtained because the width of the recording mark 26 is narrower than that of the recording mark 25.

In this embodiment, the initialization direction of the auxiliary layer 2 is made downward. However, needless to say, the initialization direction of the auxiliary layer 2 can be made upward.

[Embodiment 2]

Figure 7:
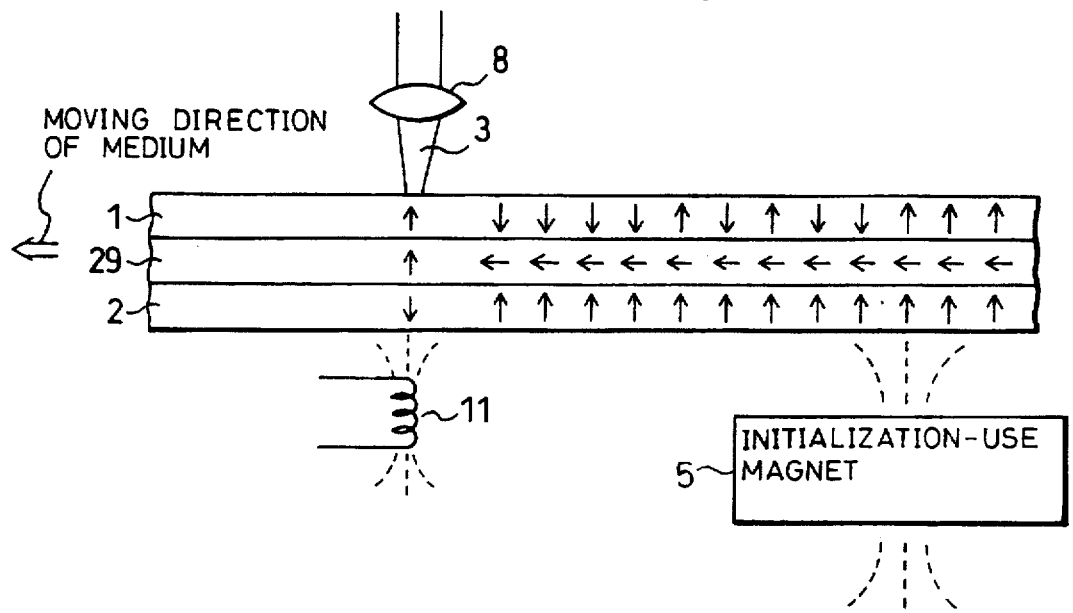
FIG. 7 is an explanatory view showing a magnetic-field modulation recording method according to a second embodiment of the present invention.

The following description will discuss a second embodiment of the present invention with reference to FIG. 7. Members which are the same as those shown in the drawings of the above-mentioned embodiment will be designated by the same code and their description will be omitted.

In this embodiment, a recording medium illustrated in FIG. 7 is used instead of the recording medium shown in FIG. 3 of Embodiment 1. The recording medium has an intermediate layer 29 between the recording layer 1 and the auxiliary layer 2. The intermediate layer 29 has in-plane magnetization at room temperature, and perpendicular magnetization at the recording temperature. A magnetic-field modulation recording device used in this embodiment has the same configuration as the one explained in Embodiment 1.

With this configuration, similarly to Embodiment 1, the auxiliary layer 2 is initialized (in an upward direction in this embodiment) in advance. Subsequently, the recording medium is relatively moved with respect to the laser beam 3 and the recording magnetic field, and a recording magnetic field is applied according to the recording information by the magnetic head coil 11 while irradiating the recording medium with the laser beam 3. Like embodiment 1, reversal of magnetization of the recording layer 1 occurs depending on the direction of magnetization of the auxiliary layer 2.

In this case, since the intermediate layer 29 is provided, the coercive force of the auxiliary layer 2 can be lowered. It is therefore possible to reverse the direction of magnetization of the auxiliary layer 2 by a low external magnetic field. Namely, by providing the intermediate layer 29, the recording magnetic field generated by the initialization-use magnet 5 can be reduced. As a result, in addition to the effect of Embodiment 1, it is possible to reduce the cost of the initialization-use magnet 5.

[Embodiment 3]

Figure 16:
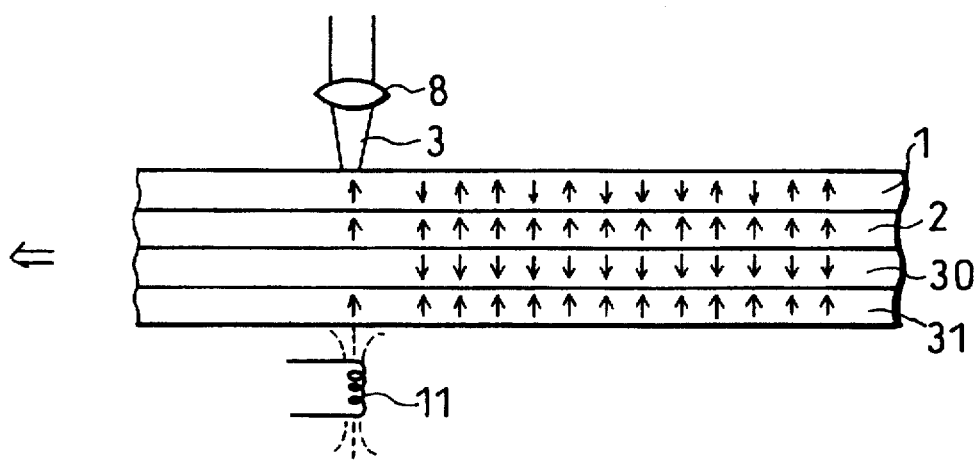
FIG. 16 is an explanatory view showing a magnetic-field modulation recording method according to a fourth embodiment of the present invention.

The following description will discuss a third embodiment of the present invention with reference to FIG. 16. Members which are the same as those shown in the drawings of the above-mentioned embodiments will be designated by the same code and their description will be omitted.

In this embodiment, a recording medium illustrated in FIG. 16 is used instead of the recording medium and the initialization-use magnet 5 shown in FIG. 3 of Embodiment 1. This recording medium includes the recording layer 1, the auxiliary layer 2, a switching layer 30 and an initialized layer 31 laminated in this order.

The switching layer 30 functions as a layer for cutting the exchange coupling between the auxiliary layer 2 and the initialized layer 31 at a predetermined temperature, and has a Curie point lower than the Curie point of the recording layer 1 and the auxiliary layer 2.

The initialized layer 31 is initialized in a uniform direction (in a downward direction in this embodiment) in advance, and the direction of magnetization of the initialized layer 31 can never change during recording and reproduction performed thereafter.

With this configuration, the recording medium is relatively moved with respect to the laser beam 3 and the recording magnetic field, and a recording magnetic field is applied by the magnetic head coil 11 according to recording information while irradiating the recording medium with the laser beam 3. When the temperature of a region irradiated by the laser beam 3 is increased and exceeds the Curie point of the switching layer 30, the magnetic coupling between the auxiliary layer 2 and the initialized layer 31 is cut. After cutting the magnetic coupling, the magnetization of the recording layer 1 and the auxiliary layer 2 is reversed in the same manner as Embodiment 1, and thus detailed explanation is omitted here.

When the temperature of the recording medium is decreased lower than the Curie point of the switching layer 30 after recording of information on the recording layer 1, the magnetic coupling between the auxiliary layer 2 and the initialized layer 31 is restored. As a result, the direction of magnetization of the auxiliary layer 2 is reversed by strong magnetic coupling forces from the initialized layer 31, and initialized in one direction.

Thus, in addition to the effect of Embodiment 1, it is possible to reduce the size of the magnetic-field modulation recording device because the switching layer 30 and the initialized layer 38 perform the function of the initialization-use magnet 5 of Embodiment 1. Moreover, since the initializing magnetic field is not limited, it is possible to relatively freely set the coercive force of the auxiliary layer 2.

[Embodiment 4]

Figure 8:
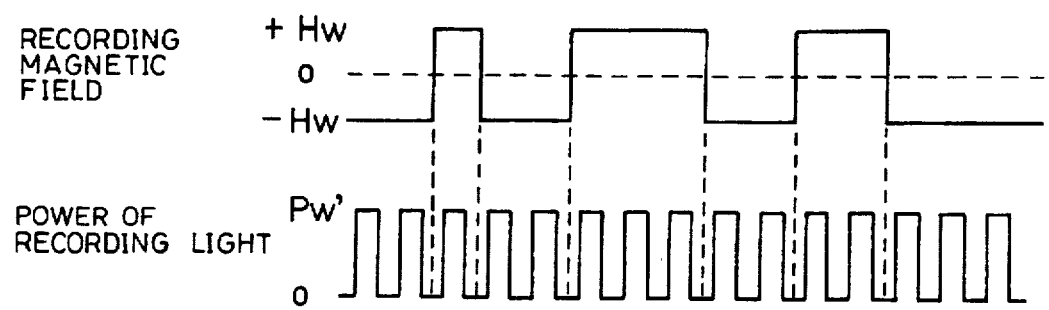
FIG. 8 is an explanatory view showing the relation between a recording magnetic field and the power of light for recording in a magnetic-field modulation recording method according to a third embodiment of the present invention.
Figure 9:
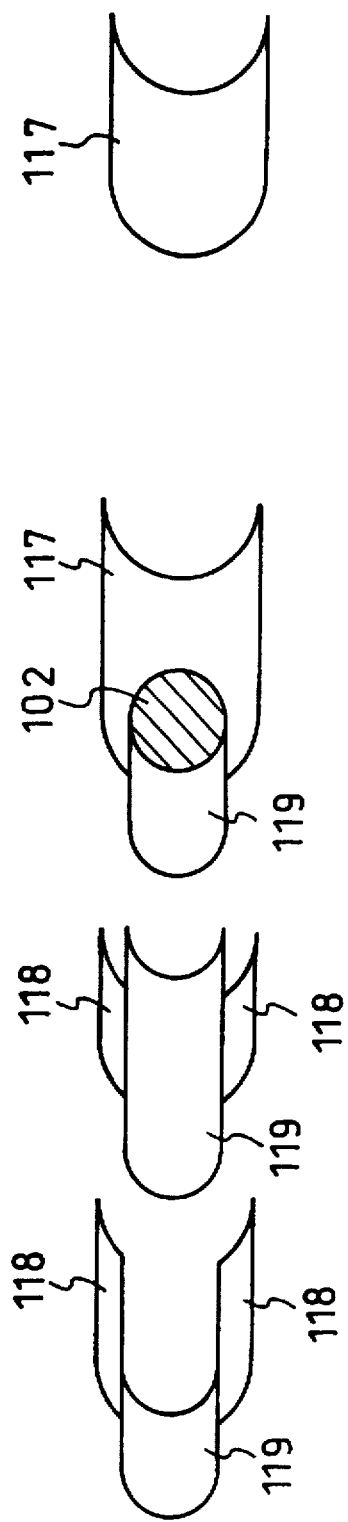
FIG. 9 is an explanatory view showing residual information remaining after conventional magnetic-field modulation overwriting.
Figure 10:
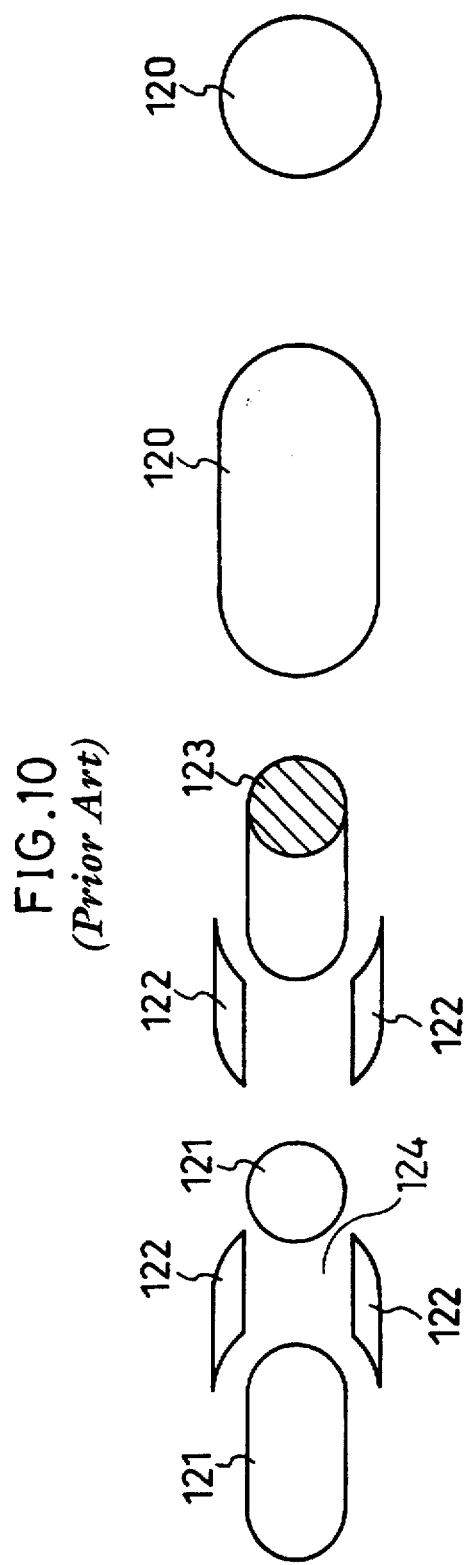
FIG. 10 is an explanatory view showing residual information remaining after conventional light-intensity modulation overwriting.
Figure 11:
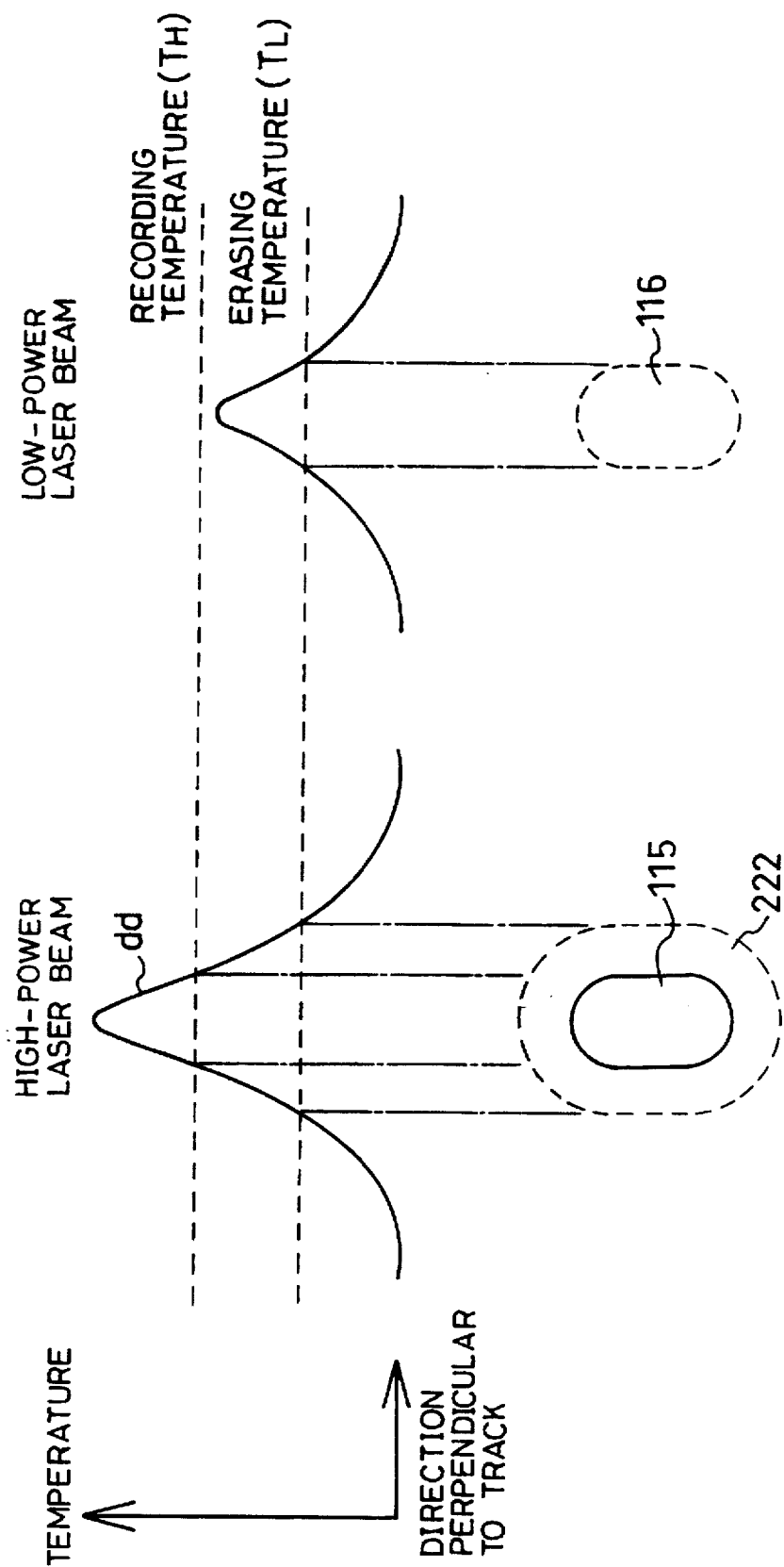
FIG. 11(a) is an explanatory view showing the temperature distribution on a track and the corresponding recorded state when a high-power laser beam was irradiated in the light-intensity modulation overwriting.
FIG. 11(b) is an explanatory view showing the temperature distribution on a track and the corresponding recorded state when a low-power laser beam was irradiated.
Figure 12:
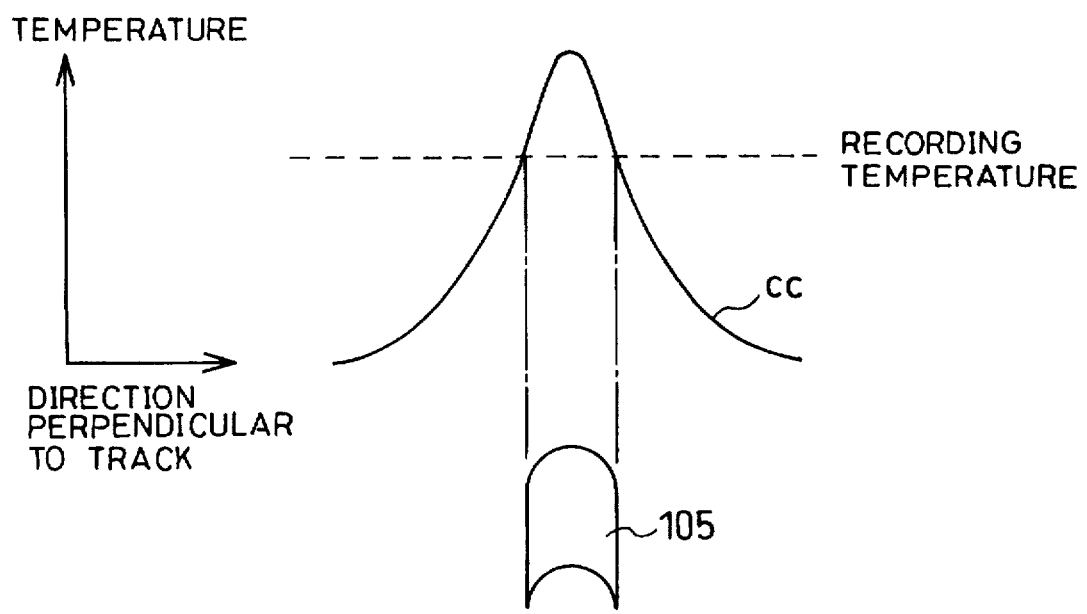
FIG. 12 is an explanatory view showing the temperature distribution on a track and the corresponding recorded state when the magnetic-field modulation overwriting was performed.
Figure 13:
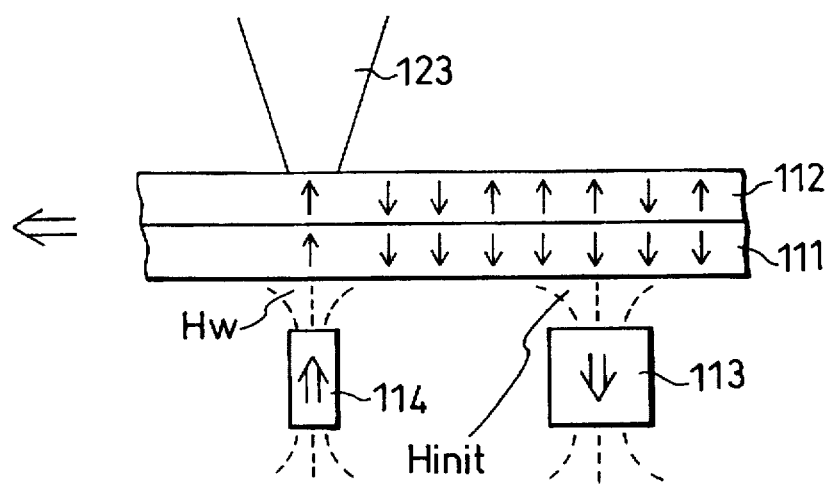
FIG. 13 is a view showing the structure of a light-intensity modulation overwriting device used for carrying out the light-intensity modulation overwriting.
Figure 14:
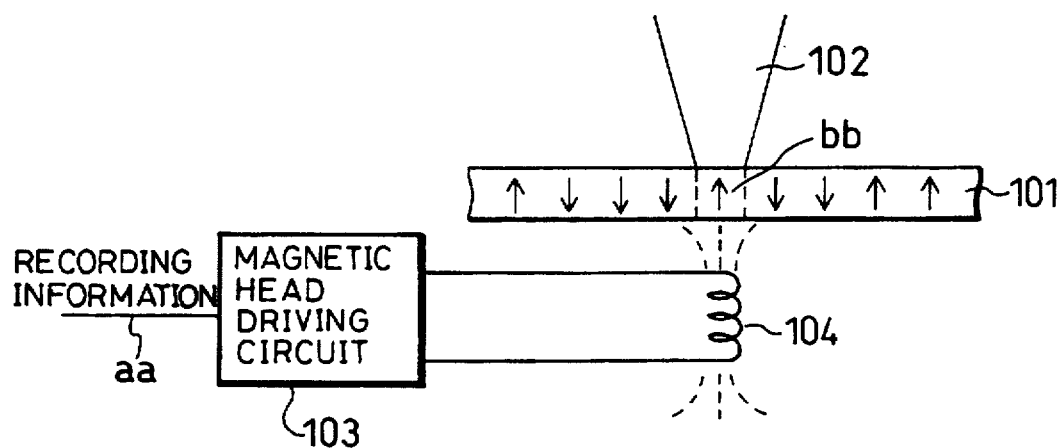
FIG. 14 is a view showing the structure of a magnetic-field modulation overwriting device used for carrying out the magnetic-field modulation overwriting.
Figure 15:
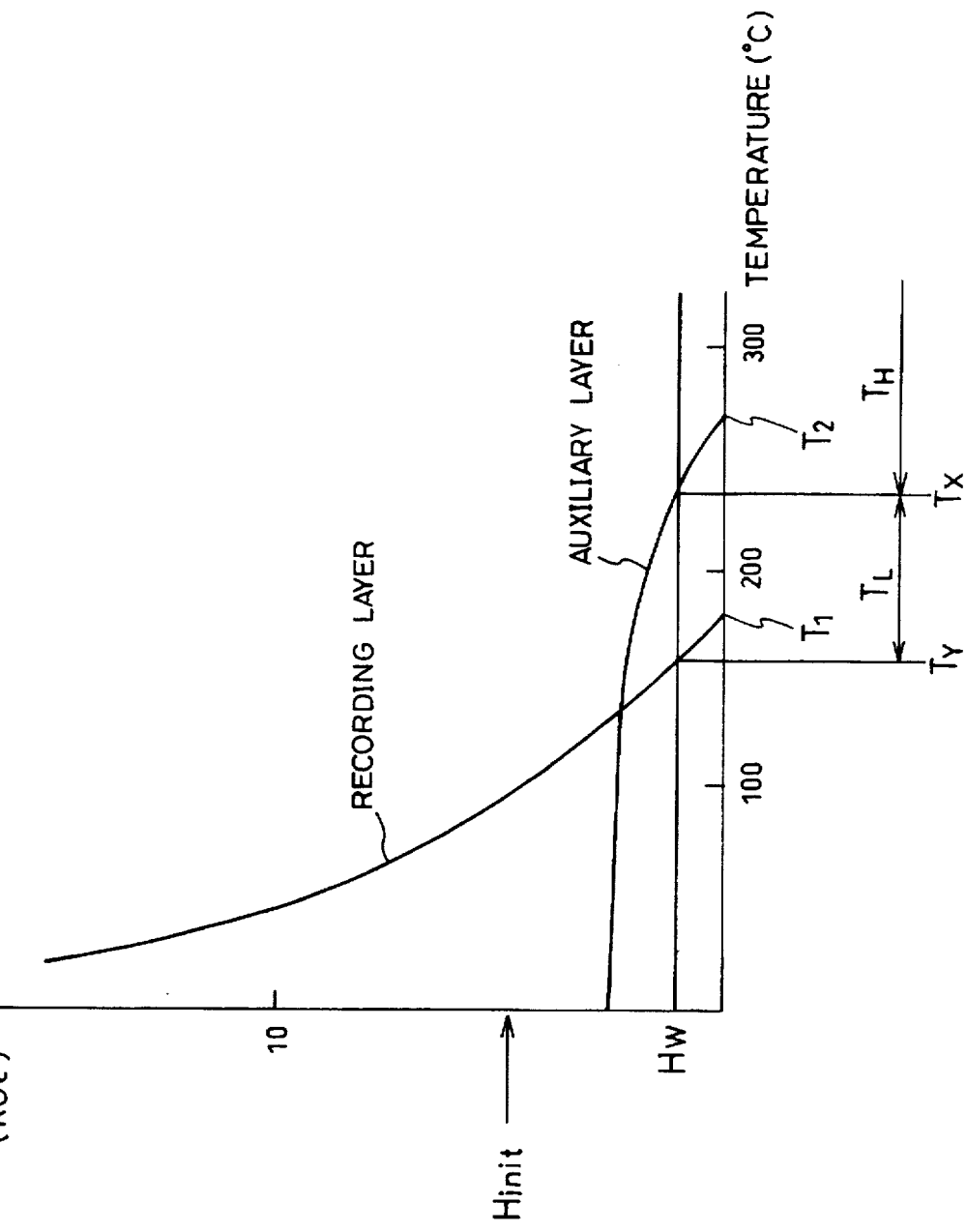
FIG. 15 is a graph showing the relation between the coercive forces of the respective layers of a multi-layer structure magneto-optical recording medium.

The following description will discuss a fourth embodiment of the present invention with reference to FIGS. 5 and 8. Members which are the same as those shown in the drawings of the above-mentioned embodiments will be designated by the same code and their description will be omitted.

In Embodiments 1 to 3, the power of the laser beam 3 for recording is set uniform. By contrast, pulsed light $P_w'$ shown in FIG. 8 is used in this embodiment. The pulsed light $P_w'$ is a rectangular wave, and its maximum value is more than the value of the uniform light $P_w$. The pulsed light $P_w'$ is synchronous with the information recording position, and becomes maximum at the information recording position.

For instance, when the recording magnetic field $H_W$ is reversed so that the recording magnetic field becomes $+H_W$ at the time the recording information is "1" and $-H_W$ at the time the recording information is "0", the power of light for recording becomes zero. Namely, it is possible to temporarily decrease the temperature of the recording medium at the moment the recording magnetic field $H_W$ is reversed. It is therefore possible to prevent the fluctuation of the edges of the recording mark 26 due to a low reversing speed of the recording magnetic field $H_W$. Accordingly, the leading and trailing edges of the recording mark 26 shown in FIG. 5 are clearly recorded, and an improved S/N ratio is achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic-field modulation recording method comprising the steps of:

preventing residual information from remaining on a magneto-optical recording medium after recording by applying to the magneto-optical recording medium a recording magnetic field whose direction is reversed according to recording information while irradiating a light beam whose power is uniform at every information recording position on said magneto-optical recording medium so that a center of a light-beam irradiated region of said magnetic-optical recording medium becomes a high-temperature portion and a periphery of said high-temperature portion becomes a medium temperature portion whose temperature is lower than a temperature of said high-temperature portion; and recording a direction of magnetization so that a direction of magnetization in said high-temperature portion is recorded according to a direction of said recording magnetic field and a direction of magnetization in said medium-temperature portion is recorded only in one direction irrespectively of the direction of said recording magnetic field.

2. The magnetic-field modulation recording method according to claim 1, wherein power of said light beam becomes zero at least at a moment said recording magnetic field is reversed during recording of information.

3. A magnetic-field modulation recording device comprising:

a magneto-optical recording medium having a recording layer on which information is recorded, and an auxiliary layer magnetic-coupled with said recording layer;

initializing means for initializing a direction of magnetization of said auxiliary layer in one direction by applying an initializing magnetic field before recording information;

light beam irradiating means, disposed distant from said initializing means, for generating a light beam whose power is uniform at every information recording position on said magneto-optical recording medium so that a center portion of a light-beam-irradiated region of said magneto-optical recording medium becomes a high-temperature portion and a periphery portion of said high-temperature portion becomes a medium-temperature portion whose temperature is lower than a temperature of said high-temperature portion;

magnetic-head driving means for generating a positive or negative recording current according to recording information; and a magnetic head coil for generating a recording magnetic field in said light-beam irradiated region based on said recording current;

wherein, in a said light-beam-irradiated region of said magneto-optical recording medium, a direction of magnetization in said high-temperature portion of said recording layer is recorded according to a direction of said recording magnetic field and a direction of magnetization in said medium-temperature portion is recorded in the same direction as an initialized direction of said auxiliary layer, thereby preventing residual information from remaining on said medium after recording.

4. The magnetic-field modulation recording device according to claim 3, wherein said initializing means is a permanent magnet.

5. The magnetic-field modulation recording device according to claim 3, wherein said initializing means is an electromagnet.

6. The magnetic-field modulation recording device according to claim 3, wherein said light beam irradiating means irradiates a light beam of uniform power during recording of information.

7. The magnetic-field modulation recording device according to claim 3,
   wherein said light beam irradiating means irradiates a light beam so that power of said light beam becomes zero at least at the moment said recording magnetic field is reversed when recording information.

8. The magnetic-field modulation recording device according to claim 7,
   wherein said light beam is pulsed light whose power is uniform at every information recording positions.

9. The magnetic-field modulation recording device according to claim 3,
   wherein said magneto-optical recording medium further comprises an intermediate layer between said recording layer and said auxiliary layer, for lowering a coercive force of said auxiliary layer.

10. A magnetic-field modulation recording device comprising:
    a magneto-optical recording medium including a recording layer on which information is recorded, an auxiliary layer magnetic-coupled with said recording layer, and an initialized layer having a magnetization whose direction is always uniform;
    light beam irradiating means for generating a light beam whose power is uniform at every information recording position on said magneto-optical recording medium so that a center of a light-beam-irradiated region of said magneto-optical recording medium becomes a high-temperature portion and a periphery of said high-temperature portion becomes a medium-temperature portion whose temperature is lower than a temperature of said high-temperature portion;
    magnetic-head driving means for generating a positive or negative recording current according to recording information; and
    a magnetic head coil for generating a recording magnetic field in said light-beam-irradiated region based on said recording current,
    wherein in said light-beam-irradiated region of said magneto-optical recording medium, a direction of magnetization in said high-temperature portion of said recording layer is recorded according to a direction of said recording magnetic field and a direction of magnetization in said medium-temperature portion is recorded in the same direction as an initialized direction of said auxiliary layer thereby prevent residual information from remaining on said medium after recording.

11. The magnetic-field modulation recording device according to claim 10,
    wherein said magneto-optical recording medium further includes between said auxiliary layer and said initialized layer a switching layer whose Curie point is lower than a Curie point of said recording layer and said auxiliary layer.

12. A magnetic-field modulation recording device comprising:
    a magneto-optical recording medium having a recording layer on which information is recorded, and an auxiliary layer magnetic-coupled with said recording layer;
    initializing means for initializing a direction of magnetization of said auxiliary layer in one direction by applying an initializing magnetic field before recording information;
    light beam irradiating means, disposed distant from said initializing means, for generating a light beam so that a center portion of a light-beam-irradiated region of said magneto-optical recording medium becomes a high-temperature portion and a periphery portion of said high-temperature portion becomes a medium-temperature portion whose temperature is lower than a temperature of said high-temperature portion;
    magnetic-head driving means for generating a positive or negative recording current according to recording information including first and second switching elements to which the recording information is input, and third and fourth switching elements to which the recording information is input after being reversed;
    a magnetic head coil for generating a recording magnetic field in said light-beam-irradiated region based on said recording current, said magnetic head coil being disposed between said first and second switching elements and between said third and fourth switching elements, and
    a current flows from said first switching element to said second switching element when said first and second switching elements are turned on, and a current flows from said third switching element to said fourth switching element when said third and fourth switching elements are turned on;
    wherein, in said light-beam-irradiated region of said magneto-optical recording medium, a direction of magnetization in said high-temperature portion of said recording layer is recorded according to a direction of said recording magnetic field and a direction of magnetization in said medium-temperature portion is recorded in the same direction as an initialized direction of said auxiliary layer.

13. A method according to claim 1 including irradiating a light beam of uniform power on said magneto-optical recording medium during recording of information.

* * * * *